US009020653B2

(12) United States Patent
Lenox

(10) Patent No.: US 9,020,653 B2
(45) Date of Patent: Apr. 28, 2015

(54) SYSTEM AND METHOD FOR ASSOCIATING A LOAD DEMAND WITH A VARIABLE POWER GENERATION

(71) Applicant: Carl J. S. Lenox, Oakland, CA (US)

(72) Inventor: Carl J. S. Lenox, Oakland, CA (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 14/012,887

(22) Filed: Aug. 28, 2013

(65) Prior Publication Data

US 2014/0005850 A1      Jan. 2, 2014

Related U.S. Application Data

(63) Continuation of application No. 13/354,217, filed on Jan. 19, 2012, now Pat. No. 8,548,637, which is a continuation of application No. 12/540,290, filed on Aug. 12, 2009, now Pat. No. 8,108,081.

(51) Int. Cl.
G05D 3/12 (2006.01)
H02J 4/00 (2006.01)
H02J 3/38 (2006.01)
H02J 13/00 (2006.01)

(52) U.S. Cl.
CPC . *H02J 4/00* (2013.01); *H02J 3/383* (2013.01); *H02J 13/0006* (2013.01); *Y04S 10/123* (2013.01); *Y02E 10/563* (2013.01); *Y02E 40/72* (2013.01)

(58) Field of Classification Search
None
See application file for complete search history.

(56) References Cited

U.S. PATENT DOCUMENTS

| 4,341,607 | A | | 7/1982 | Tison |
| 5,123,247 | A | | 6/1992 | Nelson |
| 5,532,573 | A | | 7/1996 | Brown et al. |
| 5,678,647 | A | | 10/1997 | Wolfe et al. |
| 6,037,758 | A | | 3/2000 | Perez |
| 6,166,515 | A | * | 12/2000 | Barde et al. ............ 320/101 |
| 6,512,966 | B2 | | 1/2003 | Lof et al. |
| 6,522,031 | B2 | | 2/2003 | Provanzana et al. |
| 6,577,962 | B1 | | 6/2003 | Afshari |
| 6,785,592 | B1 | | 8/2004 | Smith et al. |
| 6,885,914 | B2 | | 4/2005 | Shimode et al. |
| 7,239,035 | B2 | | 7/2007 | Garces et al. |

(Continued)

FOREIGN PATENT DOCUMENTS

JP    2006353079    12/2006

OTHER PUBLICATIONS

Salameh et al., "Multi-Stage Dual Priority Regulator for Photovoltaic Systems", IEEE, 1989, p. 308-313.*

(Continued)

*Primary Examiner* — Robert Fennema
*Assistant Examiner* — Thomas Stevens
(74) *Attorney, Agent, or Firm* — Blakely Sokoloff Taylor Zafman LLP

(57) ABSTRACT

Systems and methods for associating a load demand with a variable power generation are described. A method of providing power from a renewable resource includes receiving a signal including an output capability value for a renewable variable power generation module. An input power demand value is calculated for a load demand module based on the output capability value of the received signal. A customer load is controlled on a power transmission and distribution grid based on the calculated input power demand value.

23 Claims, 3 Drawing Sheets

(56) References Cited

U.S. PATENT DOCUMENTS

| | | |
|---|---|---|
| 7,566,980 B2 | 7/2009 | Fein et al. |
| 7,974,742 B2 | 7/2011 | Enis et al. |
| 2002/0087234 A1 | 7/2002 | Lof et al. |
| 2002/0103655 A1 | 8/2002 | Boies et al. |
| 2002/0103745 A1 | 8/2002 | Lof et al. |
| 2002/0157881 A1 | 10/2002 | Bakholdin et al. |
| 2004/0055300 A1 | 3/2004 | Lawheed |
| 2005/0033707 A1 | 2/2005 | Ehlers et al. |
| 2005/0055137 A1 | 3/2005 | Andren et al. |
| 2008/0097655 A1 | 4/2008 | Hadar et al. |
| 2008/0167756 A1 | 7/2008 | Golden et al. |
| 2008/0167931 A1 | 7/2008 | Gerstemeier et al. |
| 2008/0195255 A1 | 8/2008 | Lutze et al. |
| 2009/0088907 A1* | 4/2009 | Lewis et al. .......... 700/286 |
| 2009/0113892 A1 | 5/2009 | Chen |
| 2010/0138066 A1 | 6/2010 | Kong |
| 2010/0204844 A1 | 8/2010 | Rettger et al. |
| 2010/0211443 A1 | 8/2010 | Carrel et al. |
| 2010/0217550 A1* | 8/2010 | Crabtree et al. .......... 702/62 |
| 2010/0217642 A1* | 8/2010 | Crubtree et al. .......... 705/8 |
| 2010/0217651 A1* | 8/2010 | Crabtree et al. .......... 705/10 |
| 2010/0257895 A1 | 10/2010 | Balling et al. |
| 2010/0274407 A1 | 10/2010 | Creed |
| 2010/0324962 A1* | 12/2010 | Nesler et al. .......... 705/8 |
| 2011/0010018 A1* | 1/2011 | Haugh .......... 700/295 |
| 2011/0106321 A1 | 5/2011 | Cherian et al. |

OTHER PUBLICATIONS

Katiraei et al., "Mircogrids Management. Controls and Operation Aspects of Mircgrids", IEEE, Jun. 2008, pp. 54-65.*
International Search Report and Written Opinion from PCT/US2010/044291 mailed Apr. 18, 2011, 11 pgs.
Geidl, et al., "Optimal Power Dispatch and Conversion in Systems with Multiple Energy Carriers," Swiss Federal Institute of Technology (ETH) Zurich, Switzerland, Session 21, Aug. 2005, 7 pgs.
International Preliminary Report on Patentability from PCT/US2010/044291 mailed Feb. 23, 2012, 8 pgs.
Notification of the First Office Action from Chinese Patent Application No. 201090001081.2 mailed Aug. 29, 2012, 2 pgs.
Notification of the Decision of Rejection from Chinese Patent Application No. 201090001081.2 mailed Feb. 5, 2013, 3 pgs.
Final Office Action from U.S. Appl. No. 13/354,217 mailed Feb. 20, 2013, 16 pgs.
Non-Final Office Action from U.S. Appl. No. 13/354,217 mailed Apr. 5, 2012, 11 pgs.
Non-Final Office Action from U.S. Appl. No. 13/354,217 mailed Sep. 7, 2012, 15 pgs.
European Search Report from EP10808538.8 mailed Sep. 16, 2013, 6 pgs.
Office Action for European Patent Application No. 10808535.8 mailed May 22, 2014, 4 pgs.

\* cited by examiner

SYSTEM AND METHOD FOR ASSOCIATING A LOAD DEMAND WITH A VARIABLE POWER GENERATION

CROSS-REFERENCE TO RELATED APPLICATIONS

This application is a continuation of U.S. patent application Ser. No. 13/354,217, filed Jan. 19, 2012, which is a continuation of U.S. patent application Ser. No. 12/540,290, filed Aug. 12, 2009, now U.S. Pat. No. 8,108,081, issued Jan. 31, 2012, the entire contents of which are hereby incorporated by reference herein.

TECHNICAL FIELD

Embodiments of the present invention are in the field of renewable energy and, in particular, systems and methods for associating a load demand with a variable power generation.

BACKGROUND

Energy generation and load may be balanced on a second-to-second basis by a utility operator. Fluctuations in load and generation are typically balanced utilizing "ancillary services" which are power generation units that can be dispatched within defined timeframes. In most cases, these services are provided to the utility, Regional Transmission Operator (RTO) or Independent System Operator (ISO) by fossil-fuel fired generators. These resources may be on either "hot standby" or "spinning," meaning that they consume fossil fuels (and create emissions) even when they are not delivering power to a grid, or may be operated under part-load conditions which may result in lower efficiency and higher emissions. Moreover, the function of such units is to follow fluctuations in load and generation, requiring a quick response. Accordingly, use of more efficient generators such as combined-cycle gas turbines is generally precluded for this purpose. Most often, smaller "peaker" units are used which are often relatively low efficiency and often create significant emissions. Such peaker units may be disproportionately oil fired and are often either simple cycle gas turbines or large engine-generators.

DETAILED DESCRIPTION

Figure 1:
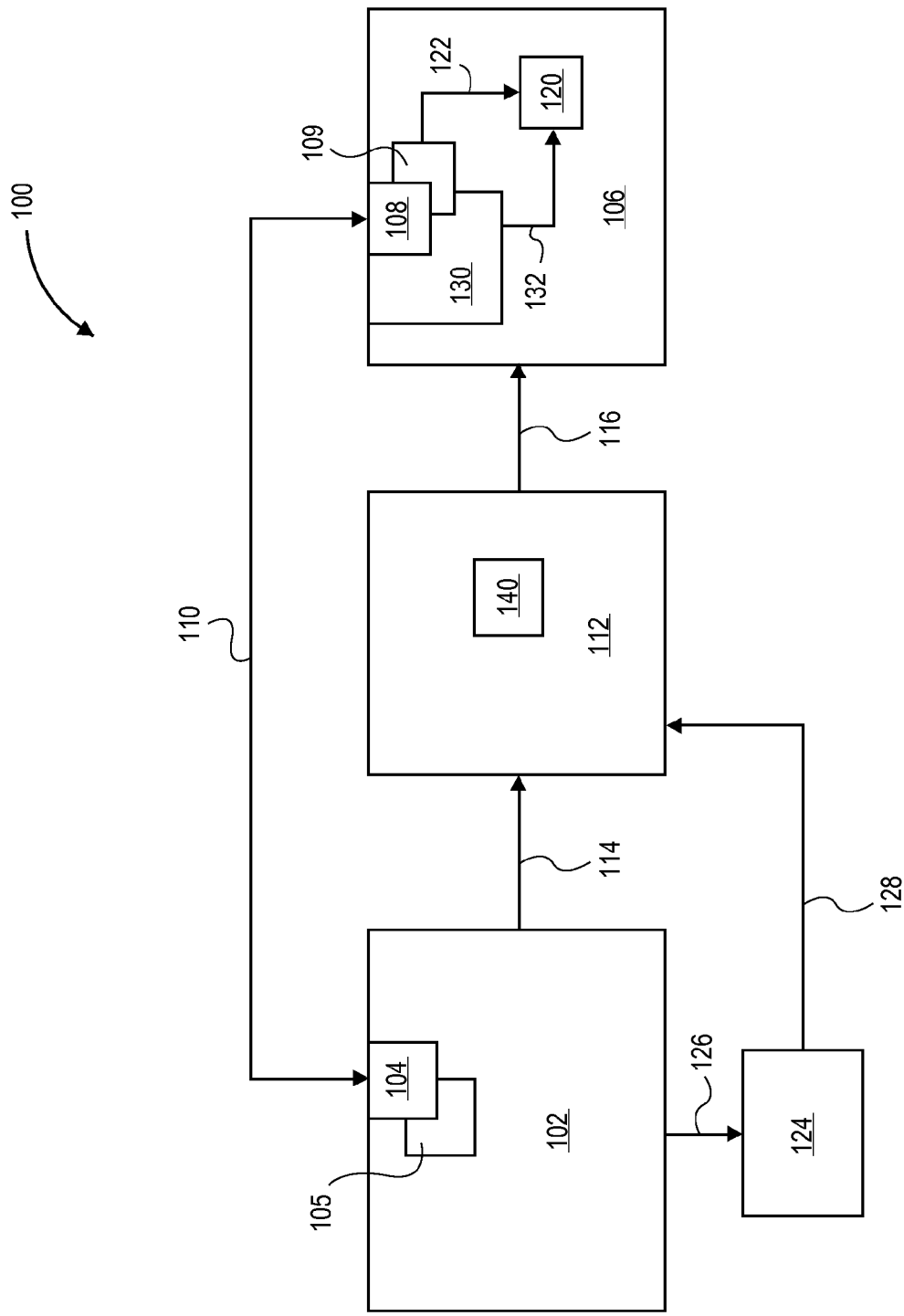
FIG. 1 illustrates a block diagram of a system for associating a load demand with a variable power generation, in accordance with an embodiment of the present invention.

Systems and methods for associating a load demand with a variable power generation are described herein. In the following description, numerous specific details are set forth, such as specific measurements, in order to provide a thorough understanding of the present invention. It will be apparent to one skilled in the art that embodiments of the present invention may be practiced without these specific details. In other instances, well-known fabrication operations, such as solar cell array assembly operations, are not described in detail in order to not unnecessarily obscure embodiments of the present invention. Furthermore, it is to be understood that the various embodiments shown in the Figures are illustrative representations and are not necessarily drawn to scale.

Disclosed herein are systems for associating a load demand with a variable power generation. In one embodiment, a system includes a renewable variable power generation module including a sensor, the sensor configured to determine an output power capability value for the renewable variable power generation module. The system also includes a load demand module including a response device, the response device configured to receive the output power capability value directly from the renewable variable power generation module and to determine an input power demand value based on the output power capability value. The system also includes a power transmission and distribution grid coupled with, and disposed in between, the renewable variable power generation module and the load demand module.

Also disclosed herein are methods for associating a load demand with a variable power generation. In one embodiment, a method includes determining an output power capability value for a renewable variable power generation module, the renewable variable power generation module comprising a sensor configured to perform the determining. The method also includes determining, for a load demand module, an input power demand value based on the output power capability value. The load demand module includes a response device configured to receive the output power capability value directly from the renewable variable power generation module and to perform the determining. A power transmission and distribution grid is coupled with, and disposed in between, the renewable variable power generation module and the load demand module.

In accordance with an embodiment of the present invention, associating a load demand with a variable power generation is performed by directly coupling communication between a renewable variable power generation module and a load demand module. In an embodiment, the direct communication by-passes an associated power transmission and distribution grid or by-passes a controller associated with an associated power transmission and distribution grid. Communication with such a controller may otherwise be required in a conventional response and demand configuration. However, in accordance with an embodiment of the present invention, an arrangement where the direct communication by-passes an associated power transmission and distribution grid or by-passes a controller associated with an associated power transmission and distribution grid enables a solar power plant to invoke a lower load demand at times of lower solar power production. In another embodiment, such an arrangement enables a solar power plant to allow a higher load demand at times of higher solar power production, or enables the opportunity to store any excess power for later demand events. In accordance with an embodiment of the present invention, a renewable power system operator can enter into contract with a Demand Response provider which controls customer loads on the same transmission or distribution network. Demand Response controlled loads would then provide some or all of the ancillary services necessary to offset the variability of the renewable resource. In an embodiment, such an arrangement includes forecasting and real-time monitoring of renewable power resources to schedule and communicate dispatch requirements to the Demand Response provider. In one embodiment, re-packaging of Demand Response resources with renewable generation is performed to provide a utility or ISO with guaranteed firm, carbon-neutral capacity. In a specific embodiment, an approach for associating a load demand with a variable power generation appears to the utility or ISO like a predictable, clean source of power without the "hidden costs" of fossil-fired ancillary services.

In an aspect of the present invention, a system is provided for associating a load demand with a variable power generation. FIG. 1 illustrates a block diagram of a system for associating a load demand with a variable power generation, in accordance with an embodiment of the present invention.

Referring to FIG. 1, a system 100 is provided for associating a load demand with a variable power generation. System 100 includes a renewable variable power generation module 102 including a sensor 104. In accordance with an embodiment of the present invention, sensor 104 is configured to determine an output power capability value 105 for renewable variable power generation module 102. System 100 also includes a load demand module 106 including a response device 108. In accordance with an embodiment of the present invention, response device 108 is configured to receive output power capability value 105 directly from renewable variable power generation module 102, as depicted by arrow 110, and to determine an input power demand value 109 based on output power capability value 105. System 100 also includes a power transmission and distribution grid 112 coupled with, and disposed in between, renewable variable power generation module 102 and load demand module 106. In a specific embodiment, power transmission and distribution grid 112 is configured to distribute power from renewable variable power generation module 102 to load demand module 106, as depicted by arrows 114 and 116, respectively, in FIG. 1. In an embodiment, renewable variable power generation module 102 is a solar variable power generation module. In a specific embodiment, load demand module 106 includes a smart appliance.

In accordance with an embodiment of the present invention, load demand module 106 is configured to control a power consumption level 120 of load demand module 106 in response to a change in input power demand value 109, as depicted by arrow 122 in FIG. 1, the change in input power demand value 109 based on a change in output power capability value 105 of renewable variable power generation module 102. In one embodiment, load demand module 106 is configured to decrease power consumption level 120 of load demand module 106 in response to a decrease in input power demand value 109, the decrease in input power demand value 109 based on a decrease in output power capability value 105 of renewable variable power generation module 102. In another embodiment, load demand module 106 is configured to increase power consumption level 120 of load demand module 106 in response to an increase in input power demand value 109, the increase in input power demand value 109 based on an increase in output power capability value 105 of renewable variable power generation module 102. In yet another embodiment, renewable variable power generation module 102 further includes a power storage module 124 configured to receive a portion of the power generated by renewable variable power generation module 102, as depicted by arrow 126, when output power capability value 105 of renewable variable power generation module 102 exceeds input power demand value 109 determined by response device 108 of load demand module 106. In a specific embodiment, power storage module 124 is coupled directly with power transmission and distribution grid 112, as depicted by arrow 128 in FIG. 1.

In an embodiment, load demand module 106 further includes a demand response provider 130 configured to control power consumption level 120 of load demand module 106, as depicted by arrow 132. In a specific embodiment, response provider 130 is a business unit or business organization. In another embodiment, power transmission and distribution grid 112 includes a power delivery requirement 140, and the change in output power capability value 105 of renewable variable power generation module 102 is transparent to power delivery requirement 140 of power transmission and distribution grid 112. In a specific embodiment, power delivery requirement 140 of electrical generating units coupled to power transmission and distribution grid 112 is approximately constant during the change in output power capability value 105 of renewable variable power generation module 102.

Figure 2:
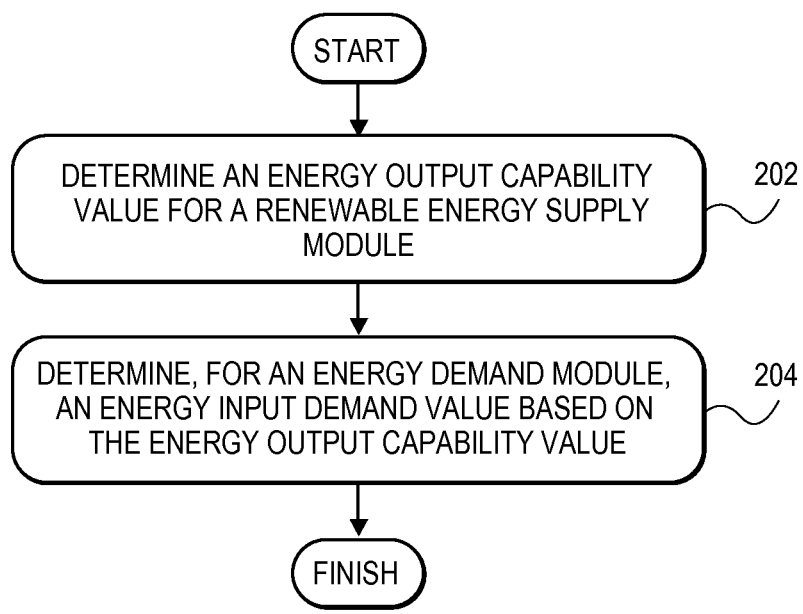
FIG. 2 illustrates a Flowchart representing operations in a method for associating a load demand with a variable power generation, in accordance with an embodiment of the present invention.

In another aspect of the present invention, a method is provided for associating a load demand with a variable power generation. FIG. 2 illustrates a Flowchart 200 representing operations in a method for associating a load demand with a variable power generation, in accordance with an embodiment of the present invention.

Referring to operation 202 of Flowchart 200, a method for associating a load demand with a variable power generation includes determining an output power capability value for a renewable variable power generation module. In accordance with an embodiment of the present invention, the renewable variable power generation module includes a sensor configured to perform the determining. In one embodiment, determining the output power capability value for the renewable variable power generation module includes determining the output power capability value for a solar variable power generation module.

Referring to operation 204 of Flowchart 200, the method for associating a load demand with a variable power generation also includes determining, for a load demand module, an input power demand value based on the output power capability value. In accordance with an embodiment of the present invention, the load demand module includes a response device configured to receive the output power capability value directly from the renewable variable power generation module and to perform the determining. In an embodiment, a power transmission and distribution grid is coupled with, and disposed in between, the renewable variable power generation module and the load demand module. In a specific embodiment, determining, for the load demand module, the input power demand value includes determining the input power demand value for a smart appliance.

The method for associating a load demand with a variable power generation may further include controlling, by the load demand module, a power consumption level of the load demand module in response to a change in the input power demand value. In accordance with an embodiment of the present invention, the change in the input power demand value is based on a change in the output power capability value of the renewable variable power generation module. In one embodiment, the method also further includes decreasing, by the load demand module, the power consumption level of the load demand module in response to a decrease in the input power demand value, the decrease in the input power demand value based on a decrease in the output power capability value of the renewable variable power generation module. In another embodiment, the method also further includes increasing, by the load demand module, the power consumption level of the load demand module in response to an increase in the input power demand value, the increase in the input power demand value based on an increase in the output power capability value of the renewable variable power generation module. In yet another embodiment, the renewable variable power generation module further includes a power storage module, and the method further includes receiving, by the power storage module, a portion of the power generated by the renewable variable power generation module when the output power capability value of the renewable variable power generation module exceeds the input power demand value determined by the response device of the load demand module. In a specific embodiment, the power storage module is coupled directly with the power transmission and distribution grid.

In an embodiment, the load demand module further includes a demand response provider, and the method further includes controlling, by the demand response provider, the power consumption level of the load demand module. In a specific embodiment, the response provider is a business unit or business organization. In another embodiment, a power delivery requirement is associated with the power transmission and distribution grid, and the change in the output power capability value of the renewable variable power generation module is transparent to the power delivery requirement of the power transmission and distribution grid. In a specific embodiment, the power delivery requirement of the power transmission and distribution grid is approximately constant during the change in the output power capability value of the renewable variable power generation module. The capacity of the grid may appear firm under such circumstances.

In an embodiment, the present invention is provided as a computer program product, or software product, that includes a machine-readable medium having stored thereon instructions, which is used to program a computer system (or other electronic devices) to perform a process or method according to embodiments of the present invention. A machine-readable medium may include any mechanism for storing or transmitting information in a form readable by a machine (e.g., a computer). For example, in an embodiment, a machine-readable (e.g., computer-readable) medium includes a machine (e.g., a computer) readable storage medium (e.g., read only memory ("ROM"), random access memory ("RAM"), magnetic disk storage media or optical storage media, flash memory devices, etc.).

Figure 3:
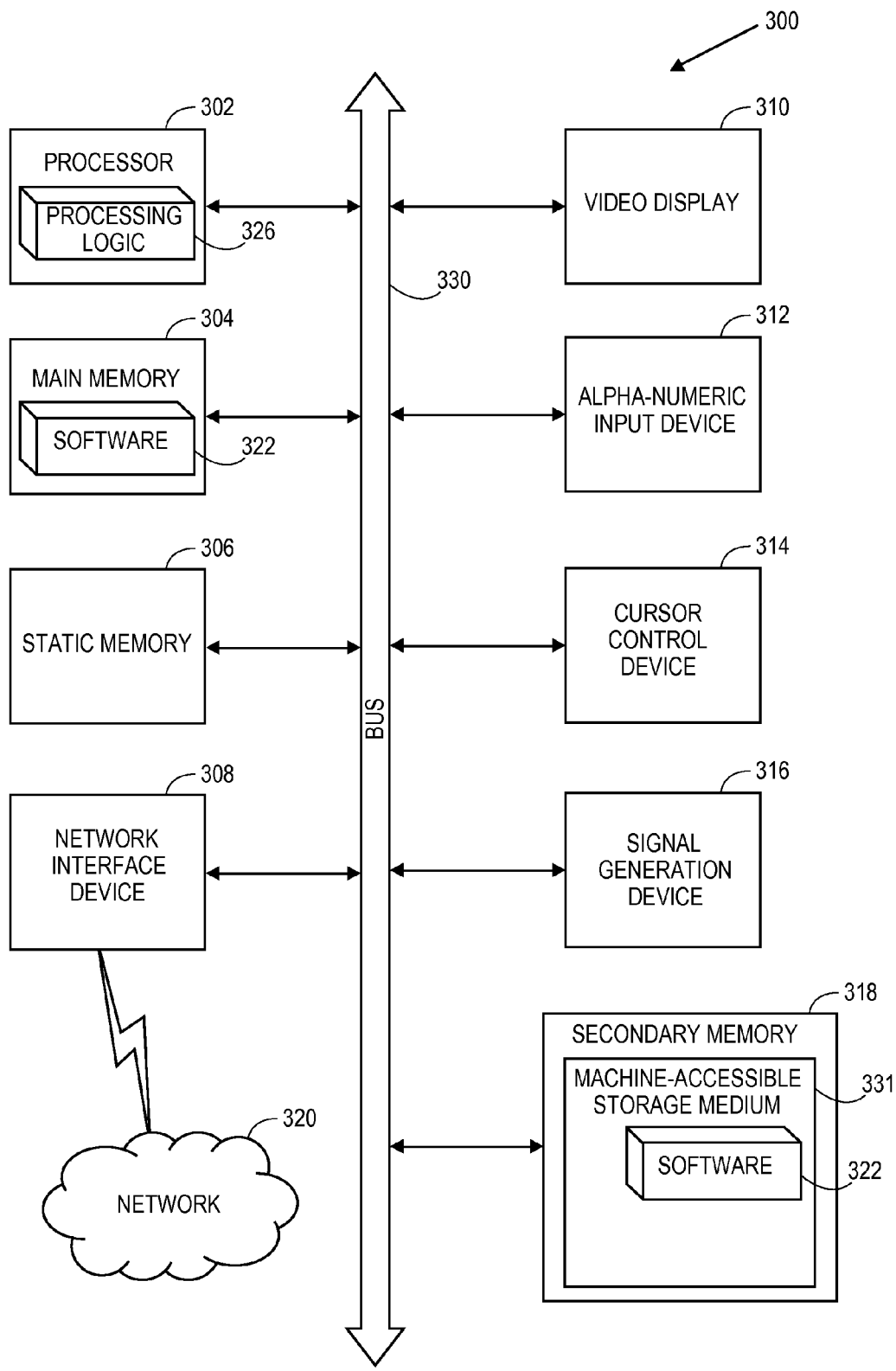
FIG. 3 illustrates a block diagram of an example of a computer system configured for performing a method for associating a load demand with a variable power generation, in accordance with an embodiment of the present invention.

FIG. 3 illustrates a diagrammatic representation of a machine in the form of a computer system 300 within which a set of instructions, for causing the machine to perform any one or more of the methodologies discussed herein, is executed. For example, in accordance with an embodiment of the present invention, FIG. 3 illustrates a block diagram of an example of a computer system configured for performing a method for associating a load demand with a variable power generation. In alternative embodiments, the machine is connected (e.g., networked) to other machines in a Local Area Network (LAN), an intranet, an extranet, or the Internet. In an embodiment, the machine operates in the capacity of a server or a client machine in a client-server network environment, or as a peer machine in a peer-to-peer (or distributed) network environment. In an embodiment, the machine is a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers or processors) that individually or jointly execute a set (or multiple sets) of instructions to perform any one or more of the methodologies discussed herein.

The example of a computer system 300 includes a processor 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a secondary memory 318 (e.g., a data storage device), which communicate with each other via a bus 330.

Processor 302 represents one or more general-purpose processing devices such as a microprocessor, central processing unit, or the like. More particularly, in an embodiment, the processor 302 is a complex instruction set computing (CISC) microprocessor, reduced instruction set computing (RISC) microprocessor, very long instruction word (VLIW) microprocessor, processor implementing other instruction sets, or processors implementing a combination of instruction sets. In one embodiment, processor 302 is one or more special-purpose processing devices such as an application specific integrated circuit (ASIC), a field programmable gate array (FPGA), a digital signal processor (DSP), network processor, or the like. Processor 302 executes the processing logic 326 for performing the operations discussed herein.

In an embodiment, the computer system 300 further includes a network interface device 308. In one embodiment, the computer system 300 also includes a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

In an embodiment, the secondary memory 318 includes a machine-accessible storage medium (or more specifically a computer-readable storage medium) 331 on which is stored one or more sets of instructions (e.g., software 322) embodying any one or more of the methodologies or functions described herein, such as a method for associating a load demand with a variable power generation. In an embodiment, the software 322 resides, completely or at least partially, within the main memory 304 or within the processor 302 during execution thereof by the computer system 300, the main memory 304 and the processor 302 also constituting machine-readable storage media. In one embodiment, the software 322 is further transmitted or received over a network 320 via the network interface device 308.

While the machine-accessible storage medium 331 is shown in an embodiment to be a single medium, the term "machine-readable storage medium" should be taken to include a single medium or multiple media (e.g., a centralized or distributed database, or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of embodiments of the present invention. The term "machine-readable storage medium" shall accordingly be taken to include, but not be limited to, solid-state memories, and optical and magnetic media.

Thus, systems and methods for associating a load demand with a variable power generation have been disclosed. In accordance with an embodiment of the present invention, a system includes a renewable variable power generation module including a sensor, the sensor configured to determine an output power capability value for the renewable variable power generation module. The system also includes a load demand module including a response device, the response device configured to receive the output power capability value directly from the renewable variable power generation module and to determine an input power demand value based on the output power capability value. The system also includes a power transmission and distribution grid coupled with, and disposed in between, the renewable variable power generation module and the load demand module. In one embodiment, the renewable variable power generation module is a solar variable power generation module. In one embodiment, the load demand module is configured to control a power consumption level of the load demand module in response to a change in the input power demand value, the change in the input power demand value based on a change in the output power capability value of the renewable variable power generation module.

What is claimed is:

1. A method of providing power from a renewable resource, the method comprising:
   receiving a signal at a response device of a load demand module directly from a renewable variable power generation module, the signal including an output capability value for the renewable variable power generation module;
   calculating an input power demand value for the load demand module based on the output capability value of the received signal; and
   controlling a customer load on a power transmission and distribution grid based on the calculated input power demand value.

2. The method of claim 1, wherein controlling the customer load comprises invoking a lower load demand at times of lower solar power production at the renewable variable power generation module.

3. The method of claim 1, wherein controlling the customer load comprises increasing load demand at times of higher than normal solar power production at the renewable variable power generation module.

4. The method of claim 1, wherein controlling the customer load comprises storing excess power for later demand events at times of higher than normal solar power production at the renewable variable power generation module.

5. The method of claim 1, wherein the renewable variable power generation module is a solar variable power generation module.

6. The method of claim 1, wherein the load demand module is a smart appliance.

7. The method of claim 1, wherein the power transmission and distribution grid comprises a power delivery requirement, and wherein controlling the customer load on the power transmission and distribution grid is performed without affecting the power delivery requirement of the power transmission and distribution grid.

8. The method of claim 7, the method further comprising:
   maintaining a power delivery requirement of electrical generating units coupled to the power transmission and distribution grid approximately constant during the controlling the customer load on the power transmission and distribution grid.

9. A method of providing power from a renewable variable power generation module, the method comprising:
   receiving a signal at a response device of a smart appliance directly from a solar power generation module, the signal including an output capability value for the solar power generation module;
   calculating an input power demand value for the smart appliance based on the output capability value of the received signal; and
   controlling a customer load on a power transmission and distribution grid based on the calculated input power demand value.

10. The method of claim 9, wherein controlling the customer load comprises invoking a lower load demand at times of lower solar power production at the solar power generation module.

11. The method of claim 9, wherein controlling the customer load comprises increasing load demand at times of higher than normal solar power production at the solar power generation module.

12. The method of claim 9, wherein controlling the customer load comprises storing excess power for later demand events at times of higher than normal solar power production at the solar power generation module.

13. The method of claim 9, wherein the power transmission and distribution grid comprises a power delivery requirement, and wherein controlling the customer load on the power transmission and distribution grid is performed without affecting the power delivery requirement of the power transmission and distribution grid.

14. The method of claim 13, the method further comprising:
   maintaining a power delivery requirement of electrical generating units coupled to the power transmission and distribution grid approximately constant during the controlling the customer load on the power transmission and distribution grid.

15. A system for associating a load demand with a variable power generation, the system comprising:
   a renewable variable power generation module comprising a sensor, the sensor configured to determine an output power capability value for the renewable variable power generation module; and
   a load demand module comprising a response device, the response device configured to receive the output power capability value directly from the renewable variable power generation module and to determine an input power demand value based on the output power capability value, wherein the renewable variable power generation module and the load demand module are adaptable to be coupled with a power transmission and distribution grid in between the renewable variable power generation module and the load demand module.

16. The system of claim 15, wherein the renewable variable power generation module is a solar variable power generation module.

17. The system of claim 15, wherein the load demand module is configured to control a power consumption level of the load demand module in response to a change in the input power demand value, the change in the input power demand value based on a change in the output power capability value of the renewable variable power generation module.

18. The system of claim 17, wherein the power transmission and distribution grid comprises a power delivery requirement, and wherein the change in the output power capability value of the renewable variable power generation module is transparent to the power delivery requirement of the power transmission and distribution grid.

19. The system of claim 18, wherein the power delivery requirement of the power transmission and distribution grid is approximately constant during the change in the output power capability value of the renewable variable power generation module.

20. The system of claim 17, wherein the load demand module is configured to decrease the power consumption level of the load demand module in response to a decrease in the input power demand value, the decrease in the input power demand value based on a decrease in the output power capability value of the renewable variable power generation module.

21. The system of claim 17, wherein the load demand module is configured to increase the power consumption level of the load demand module in response to an increase in the input power demand value, the increase in the input power demand value based on an increase in the output power capability value of the renewable variable power generation module.

22. The system of claim 17, wherein the renewable variable power generation module further comprises a power storage module, the power storage module configured to receive a portion of power generated by the renewable variable power generation module when the output power capability value of the renewable variable power generation module exceeds the input power demand value determined by the response device of the load demand module.

23. The system of claim 17, wherein the load demand module further comprises a demand response provider, the demand response provider configured to control the power consumption level of the load demand module.

\* \* \* \* \*